US008944276B2

(12) United States Patent
Garagiola

(10) Patent No.: US 8,944,276 B2
(45) Date of Patent: Feb. 3, 2015

(54) DUMPSTER WITH A MOVEABLE FALSE FLOOR AND METHOD OF COLLECTING TRASH USING THE SAME

(76) Inventor: Tony Garagiola, Charlotte, NC (US)

( * ) Notice: Subject to any disclaimer, the term of this patent is extended or adjusted under 35 U.S.C. 154(b) by 607 days.

(21) Appl. No.: 11/789,610

(22) Filed: Apr. 25, 2007

(65) Prior Publication Data

US 2008/0017645 A1 Jan. 24, 2008

Related U.S. Application Data

(60) Provisional application No. 60/811,266, filed on Jun. 6, 2006.

(51) Int. Cl.

| | |
|---|---|
| ***B65D 43/12*** | (2006.01) |
| ***B65D 43/20*** | (2006.01) |
| ***B65D 1/24*** | (2006.01) |
| ***B65D 1/36*** | (2006.01) |
| ***B65D 25/04*** | (2006.01) |
| ***B65D 57/00*** | (2006.01) |
| ***B65D 85/00*** | (2006.01) |
| ***B65D 6/28*** | (2006.01) |
| ***B65D 8/04*** | (2006.01) |
| ***B65D 8/06*** | (2006.01) |
| ***B67D 7/84*** | (2010.01) |
| ***A45D 24/22*** | (2006.01) |
| ***B65D 83/00*** | (2006.01) |
| ***B65G 65/44*** | (2006.01) |
| ***G01F 11/10*** | (2006.01) |
| ***B67D 7/60*** | (2010.01) |
| ***B65B 21/02*** | (2006.01) |
| ***B65B 69/00*** | (2006.01) |
| ***B65F 3/02*** | (2006.01) |
| ***B65G 65/04*** | (2006.01) |
| ***B65G 65/34*** | (2006.01) |
| ***B65F 1/12*** | (2006.01) |

(52) U.S. Cl.

CPC . *B65F 1/122* (2013.01); *B65F 1/12* (2013.01); *Y10S 220/908* (2013.01); *Y10S 206/804* (2013.01); *Y10S 206/817* (2013.01)

USPC ........... 220/625; 220/529; 220/530; 220/908; 206/804; 206/817

(58) Field of Classification Search

USPC .............. 220/559, 229, 529, 345.4, 530, 625, 220/908; 222/166, 199, 342, 386; 414/810; 206/804, 817

See application file for complete search history.

(56) References Cited

U.S. PATENT DOCUMENTS

| | | | | | |
|---|---|---|---|---|---|
| 4,260,317 | A | * | 4/1981 | Martin et al. | 414/517 |
| 4,431,360 | A | * | 2/1984 | Maeno | 414/294 |
| 5,009,564 | A | * | 4/1991 | Lutz et al. | 414/510 |
| 5,314,290 | A | * | 5/1994 | Lutz et al. | 414/509 |
| 5,645,187 | A | * | 7/1997 | Brown | 220/495.06 |

* cited by examiner

*Primary Examiner* — Fenn Mathew
*Assistant Examiner* — Andrew T Kirsch
(74) *Attorney, Agent, or Firm* — F. Rhett Brockington

(57) ABSTRACT

A dumpster having a moveable false floor which moves from a bottom of the dumpster toward a top opening when the dumpster is tilted to a substantially inverted orientation during collection of trash. The moveable false floor has freedom to move a predetermined length toward the top opening, where upon reaching the predetermined length a restraining device abruptly stops the floor causing the dumpster to shake dislodging adhered trash. Upon being returned to an upright orientation the moveable false floor moves back to the bottom.

9 Claims, 4 Drawing Sheets

DUMPSTER WITH A MOVEABLE FALSE FLOOR AND METHOD OF COLLECTING TRASH USING THE SAME

CROSS REFERENCE TO RELATED PATENT APPLICATIONS

This application claims the benefit of the earlier filed provisional patent application filed on Jun. 6, 2006, bearing the Ser. No. 60/811,266.

FIELD OF THE INVENTION

The present invention relates to trash collection receptacles, and more particularly to a dumpster that empties quickly without the need of shaking or banging the dumpster using the hydraulic lifting-tilting system.

BACKGROUND OF THE INVENTION

Dumpsters and other trash receptacles are typically unloaded using large trash collection trucks with hydraulic lifting-tilting systems that lift and tilt the dumpster to an inverted position. In the tilted position the trash is no longer supported by the dumpster's floor, and a portion of the trash is pulled by gravity into the bay of the trash collection truck through the collection port. Even though the dumpster is inverted, a residual portion of trash is retained therein, adhered to the sidewalls and rim of the dumpster. Adhesive-like materials, such as proteinaceous mixtures, sugars, starches, and other polymeric materials, typically hold the residual trash. To dislodge the residual trash the hydraulic system is used to violently shake and bang the dumpsters. The violent action is relatively effective at breaking loose the retained trash, however the shaking and banging is noisy, it bends and knocks paint off the dumpsters, and it applies a tremendous strain on the trash collection truck's hydraulic lifting-tilting system. The strain results in much higher maintenance cost of the hydraulic lift system. The cost directly attributable to shaking and banging dumpsters is on the order of $3000/month. There are an estimated 147,000 trash collection trucks with hydraulic lifting-tilting systems in the United States, and the annual maintenance cost for the hydraulic lifting-tilting systems alone is $5.29 billion.

What is needed is an improved dumpster that can be emptied without utilizing the truck's trash collection hydraulic lifting-tilting system to shake the dumpster.

In addition, what is needed is an improved dumpster that is less noisy to operate. Most of the noise that is produced during trash collection is generated during the process of violently shaking and banging to dislodge the residual trash. A quieter dumpster would enable longer trash collection hours, as much of the disruptive noise would be eliminated, and potentially fewer number of trucks would be required to collect the trash.

Further what is needed is apparatus for retrofitting existing dumpsters such that they have the operational performance characteristics of the invented disclosed dumpster.

DESCRIPTION OF THE PRIOR ART

Applicant is aware of the following U.S. patents and Publications:

U.S. Pat. No. 5,599,071 to Kann et al. is a multiple compartment storage body for a refuse collection vehicle includes a floor, a roof, a plurality of walls and a partition. The plurality of walls extend between the floor and the roof and include a front wall, a rear wall, and side walls between the front wall and the rear wall. The roof, floor and walls define an interior storage space. The walls define a discharge opening. The partition extends from the front wall towards the rear wall and is positioned between the floor and the roof to divide the interior storage space into an upper compartment having a volume and a lower compartment having a volume. The partition is vertically movable so as to increase the volume of one of the upper and lower compartments in communication with the discharge opening. The partition does not serve to push out trash, but to change the volume of the partitioned interior storage space.

U.S. Pat. No. 6,024,238 to Philip Jaros teaches a trash receptacle with a slowly closing lid is provided. The lid has a damper arrangement that retards movement of the lid as the lid closes. The slow movement of the lid that is provided by the damper arrangement allows the lid to close quietly and safely by itself.

US Patent Publication No. 2002/0008104 to Nathan L. Pickler discloses a universal dumpster adapted for use with both conventional front loading and roll-off refuse collection trucks. A universal dumpster according to this invention includes a floor, a pair of side walls, and a pair of end walls. The floor, side walls and end walls together define an interior compartment for collecting and containing solid waste. Sleeves rotatably mounted to the side walls engage the lifting arms of a front loading truck. At least one of the end walls includes a door that is movable between a first fully closed position and a second fully opened position for depositing solid waste into the dumpster and discharging the solid waste from the dumpster. The rotatable sleeves reduce the forces exerted on the lifting arms of the front loading truck. Accordingly, the capacity of the dumpster may be increased, however, rotatable sleeves do not serve to push out trash, but to change the capacity of the truck.

SUMMARY OF THE INVENTION

The invented dumpster comprises a walled container with a moveable false floor. The moveable false floor has a planar member having a plurality of upper coupling elements on a lower side of the planar member. There are also a plurality of lower coupling elements fixedly attached to the dumpster proximate to the bottom; and a restraining means. The restraining means comprises a plurality of connecting elements, where a connecting element is attached to an upper coupling element and a lower coupling element. The restraining means provides the moveable false floor freedom to fall a predetermined length toward the top opening, pushing out trash when the dumpster is tilted toward an inverted orientation. Upon reaching the predetermined length, the restraining means abruptly stops the falling floor, causing the dumpster to shake, which dislodges adhered trash. When the dumpster is returned to an upright orientation, the floor returns to the bottom of the dumpster. The moveable false floor eliminates the need for shaking and banging the dumpster with the hydraulic lifting-tilting system. Normally, there are at least four upper coupling elements on a lower side of the planar member, and four lower coupling elements fixedly attached to the dumpster proximate to the bottom, where a pair of upper and lower coupling elements are connected by a connecting element.

The restraining means has a collapsible member such as a chain, a telescoping rod, a pneumatic cylinder, a hydraulic cylinder, a cable, a line, or a combination thereof. The preferred collapsible member is a chain is strong, durable, easy to attach to a coupling element, inexpensive, and the length can be easily adjusted to a predetermined length. A chain is substantially inelastic, and so when it is fully extended it produces a finite abrupt stop to the downward movement of the moveable false floor, which in turn causes the dumpster to shake, dislodging adhered trash. If the invented dumpster is shaken using the hydraulic lifting-tilting system the movable floor amplifies the shaking and banging. The invented dumpster preferably further comprises a plurality of stops that prevent the moveable false floor from impinging lower coupling elements. The stops can have a dampening means that slowly stop the movement of the false floor when it returns to the bottom of the dumpster. The disclosed dumpster can be further comprised of a guiding means, which maintains the moveable false floor aligned substantially perpendicular to a sidewall of the dumpster, and delays movement by the false floor until the dumpster is approaching a fully inverted orientation. The advantage of delaying movement by the false floor until the dumpster is approaching a fully inverted orientation is that entire floor will fall the full predetermined length over a shorter time period, and will have higher a momentum, and therefore produce greater shaking and banging. An example of the there is a plurality of vertical longitudinal rails and intersecting slidable members. Most dumpsters also have a covering lid that closes over the top opening, that opens when the dumpster is inverted.

The method of collecting trash from a dumpster having a moveable false floor, a top opening and a bottom comprising the steps of: engaging the dumpster using a hydraulic lifting-tilting system; raising the dumpster from its storage location to a position substantially above a collection port of a trash collection truck; tilting the dumpster from an upright orientation towards an inverted orientation, therein causing said moveable false floor to drop a predetermined length from the bottom of the dumpster, said predetermined length being set by a restraining means, wherein said dropping false floor pushes trash out of the dumpster through the top opening, and upon reaching the predetermined length the floor is abruptly stopped causing the dumpster to shake therein dislodging adhered trash; returning the dumpster to the upright position causing the moveable false floor to move back to the bottom; lowering the dumpster; and disengaging the hydraulic lifting-tilting system from the dumpster.

A conventional dumpster can be converted to the disclosed dumpster. The conversion method comprising the steps of: opening and/or removing a covering lid if the dumpster is equipped with one; removing all or selected portions of the fixed bottom wall of the dumpster to create access from the bottom of the dumpster; fixedly attaching a plurality of stops and a plurality of lower coupling elements to the dumpster at a point proximate to the bottom side, where the stops are positioned to prevent the moveable false floor from hitting the lower coupling elements; fitting the moveable false floor comprised of a planar member with a plurality of upper coupling elements on a lower side of the plate; lowering the moveable false floor into the dumpster such that said moveable false floor rests on the stops; repositioning the covering lid if the dumpster is equipped with one; and attaching a restraining means, wherein said restraining means comprises a plurality of connecting elements, where a connecting element is attached to an upper coupling element and a lower coupling element, where said restraining means provides the moveable false floor freedom to move a predetermined length toward the top opening before being stopped when the dumpster is tilted towards an inverted orientation, and then return to the bottom of the dumpster after the dumpster is returned to a substantially upright orientation.

BRIEF DESCRIPTION OF THE DRAWINGS

The foregoing and other objects will become more readily apparent by referring to the following detailed description and the appended drawings in which.

DETAILED DESCRIPTION

Figure 1:
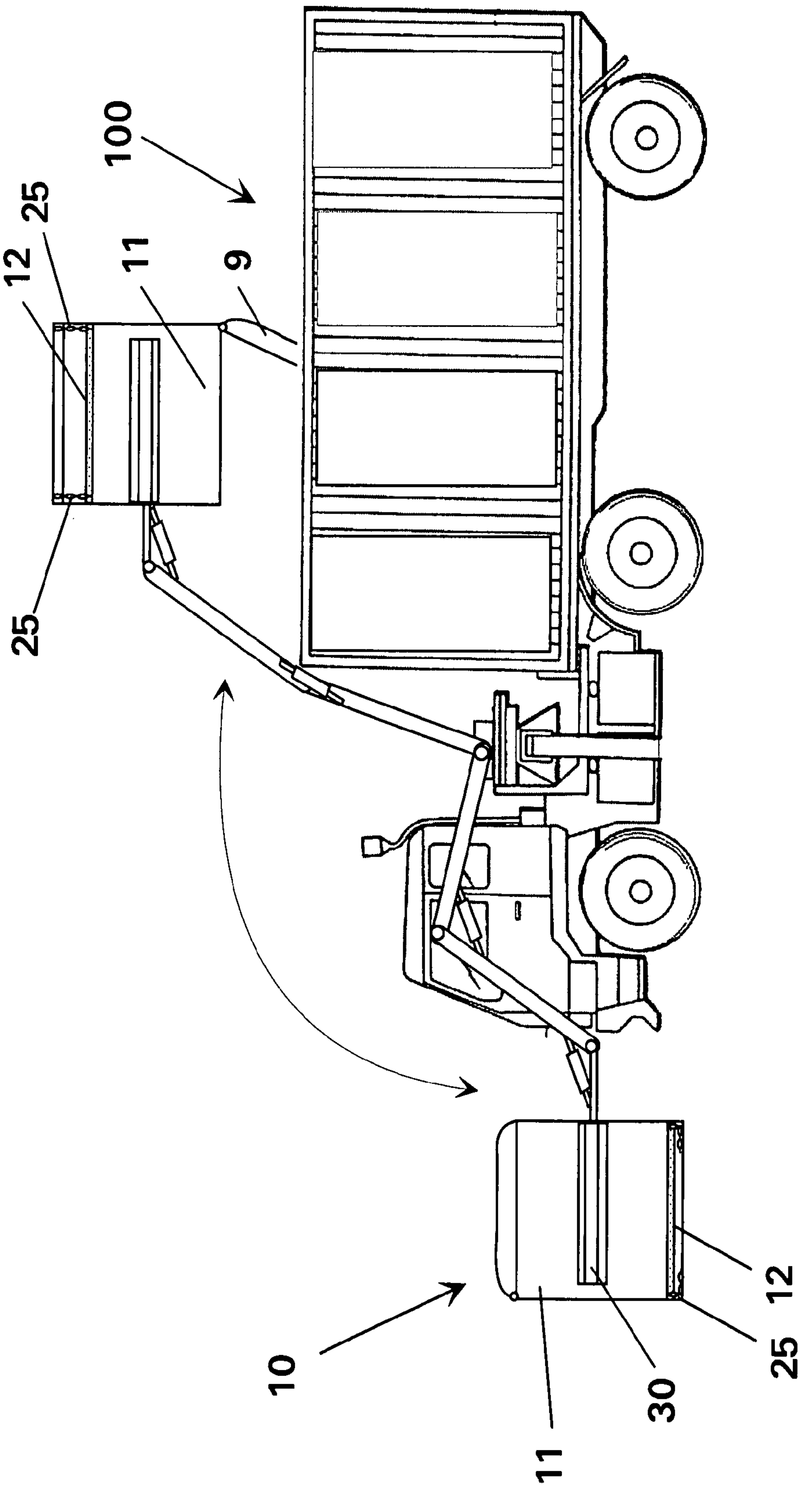
FIG. 1 is a side view of the invented dumpster with a movable false bottom and a trash collection truck, diagrammatically illustrating that when the dumpster is lifted and tilted toward an inverted orientation, the bottom moves downward, therein pushing trash out of the top opening and causing the dumpster to shake.
Figure 2B:
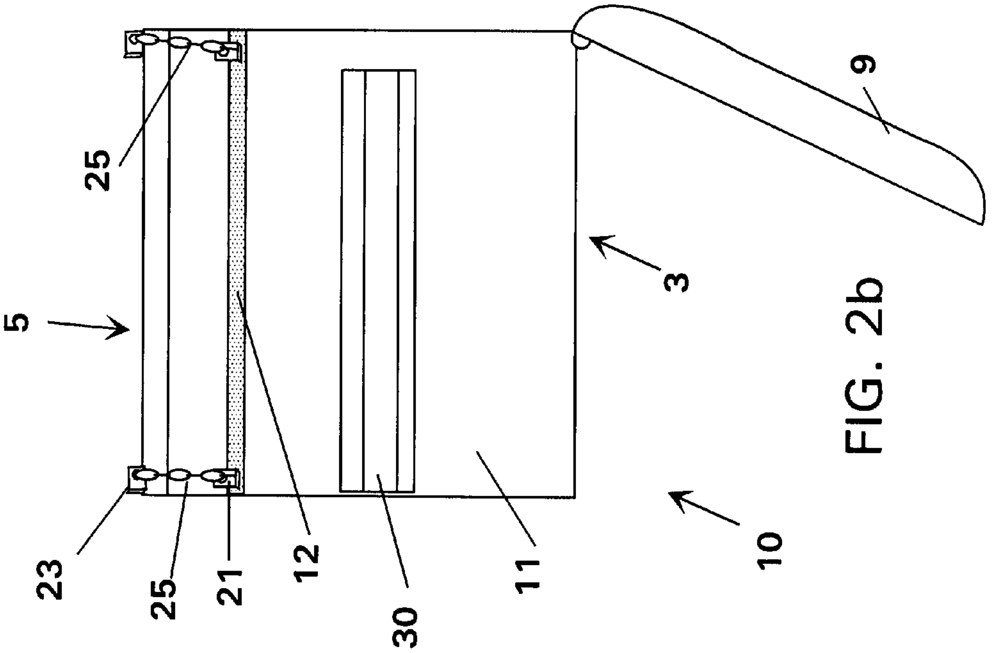
FIG. 2*b* is a side view of the invented dumpster having an inverted orientation, wherein the viewer can see the restraining means fully extended to a predetermined length and the position of the movable false bottom when the restraining means are fully extended.
Figure 2A:
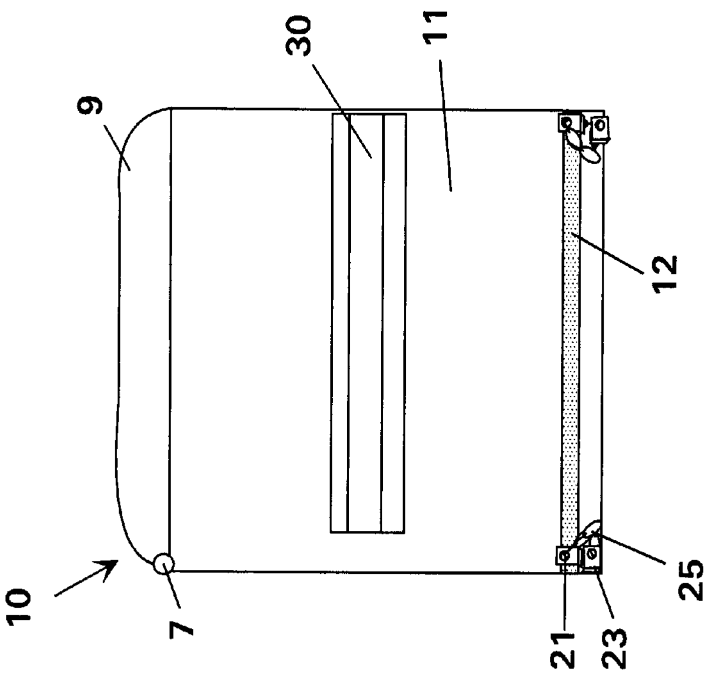
FIG. 2*a* is a side view of the invented dumpster having an upright orientation, wherein the viewer can see the restraining means in a collapsed mode and the position of the movable false bottom.

Referring now to the drawings, and particularly to FIG. 1, FIG. 2*a* and FIG. 2*b*, the invented dumpster 10 is a walled container 11 with a moveable false floor 12. The illustrated dumpster 10 has a covering lid 9 that is hinged 9, so that when the dumpster is tilted to an inverted orientation the lid opens exposing a top opening 3 as illustrated in FIG. 2*b*. The illustrated dumpster has forklift channels 30 that receive and are engaged by forks on a trash collection truck 100 fitted with a hydraulic lifting-tilting system. The invented dumpster has a moveable false floor 12 comprised of a planar member that substantially forms the cross-sectional area of the floor. Attached or otherwise apart of the planar member are a plurality of upper coupling elements 21, on a lower side of the planar member (moveable false floor 12). A plurality of lower coupling elements 23 are fixedly attached to the dumpster 10 proximate to the bottom 5. There is a restraining means comprised of a plurality of connecting elements, where a connecting element 25 is attached to an upper coupling element 21 and a lower coupling element 23. The connecting elements in unison provide the moveable false floor freedom to fall a predetermined length toward the top opening 3, therein pushing out trash when the dumpster is tilted toward an inverted orientation as shown in FIG. 2*b*. When the movable floor 12 reaches the predetermined length the restraining means abruptly stops the floor causing the dumpster to shake dislodging adhered trash. After emptying, the dumpster is returned to an upright orientation, and the floor returns to the bottom 5 of the dumpster 10.

Figure 3:
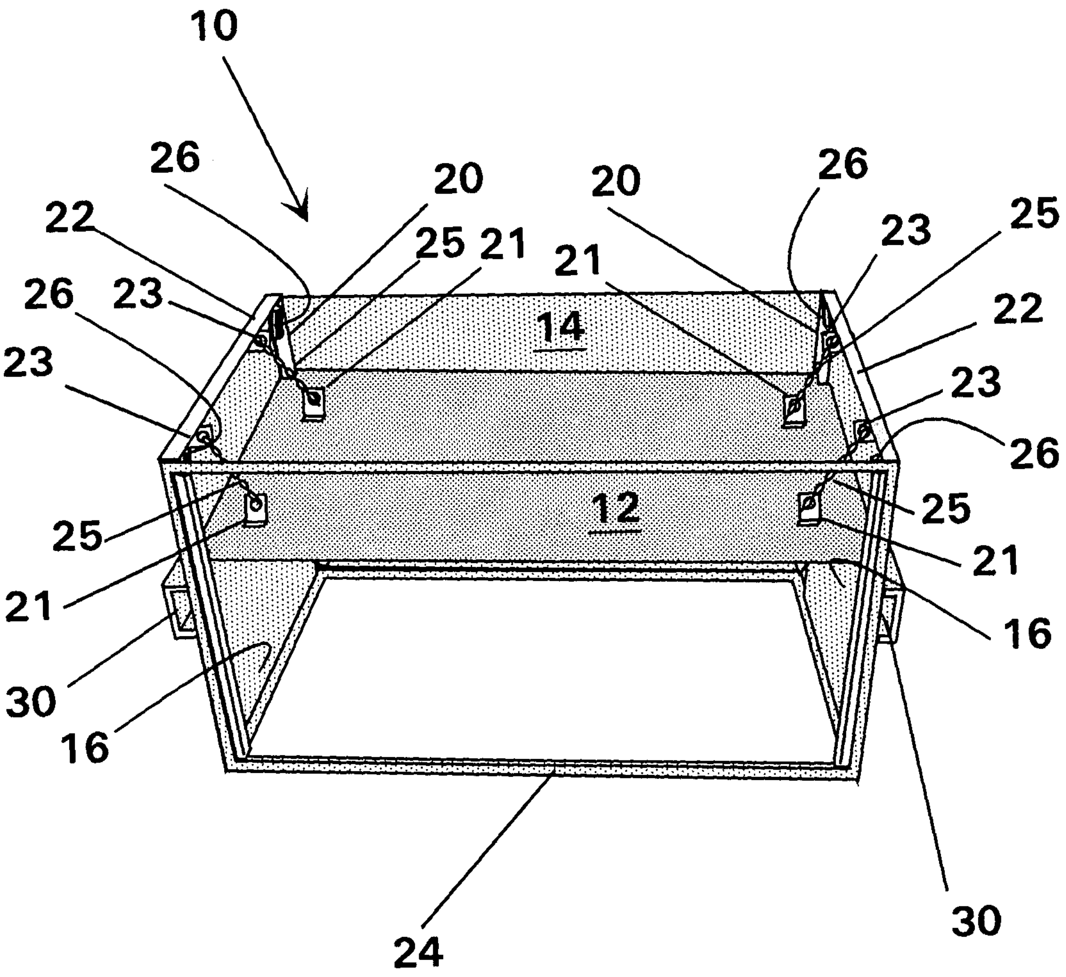
FIG. 3 is a perspective elevational view of the inverted dumpster without a covering lid, wherein a side-wall 14 of the dumpster is removed to enable the viewer to see the interior of the dumpster.
Figure 4:
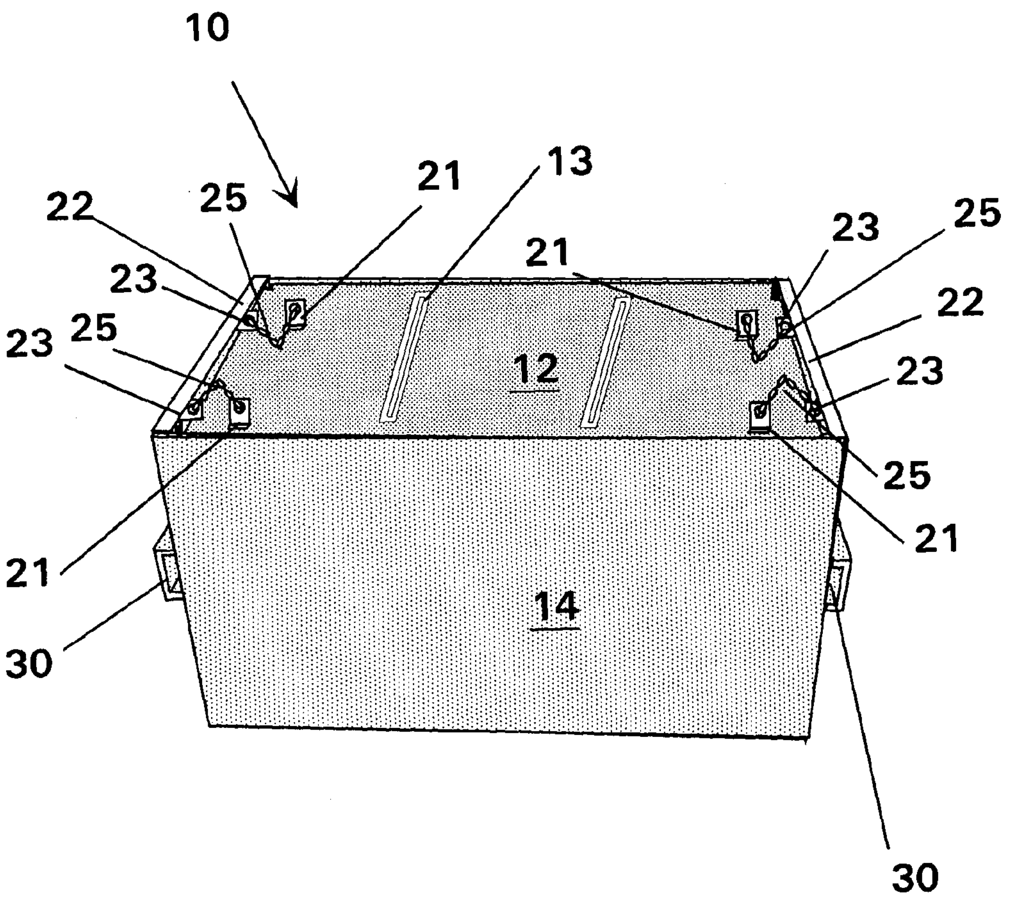
FIG. 4 is a perspective elevational view of the inverted dumpster without a covering lid, just prior to movement by the movable false bottom, wherein the planar member forming the movable false bottom of the dumpster is structurally reinforced with a beam.

FIG. 3 is a perspective elevational view of the inverted dumpster without a covering lid, wherein a side-wall 14 of the dumpster is removed to enable the viewer to see the interior of the dumpster. The planar member forming the movable false floor 12 is illustrated as a flat sheet, but as shown in FIG. 4 the floor can have structural reinforcing elements 13, such as beams. Likewise, the sidewalls 14, 16 (shown in FIG. 3 and FIG. 4) are also depicted as being unsupported sheets, and this is for merely clarifying the invention and is not meant as limiting, and the sidewalls can have structural reinforcing elements.

The connecting elements 25 as previously discussed extend to a predefined length. This is shown in FIG. 3, where upon reaching that length, they define the distance of travel of the movable floor from the bottom 5 toward the top opening 3. The movable floor 12 does not need to travel all the way to the top opening 3 to effectively facilitate emptying the dumpster. If the movable floor moves less than a few feet it is relatively easy to keep aligned, and yet provides enough force to quickly push out the trash and shake the dumpster so as to dislodge trash adhered to the sidewalls of the dumpster. Chain is a preferable connecting element 25 that is a collapsible member. Chain is strong, inexpensive, easy to install, relatively easy to adjust, it is highly collapsible, requiring little space when the movable floor is on the bottom of the dumpster, and it does not easily entangle so long as both ends are connected. As can be seen in FIG. 3 and FIG. 4, the chain 25 is connected to eyelets and the like. The upper coupling element 21 is a bracket with an eyelet, and the lower coupling element 23 is a bracket with an eyelet attached to the flange 22.

The dumpster preferably has a plurality of stops 26 that prevent the moveable false floor 12 from hitting the plurality of lower coupling elements 23. The stops 26 can be selected to also impart noise dampening as the floor returns to the bottom, as well as stop the movement of the floor. Examples of noise dampeners are rubber pads, springs, pressure release pistons, and the like.

The moveable false floor 12 can additionally be aligned with a guiding means 20, which is shown in the corners formed by the side-wall 14 and the end-wall 16. The guiding means 20 comprises a plurality of vertical longitudinal rails and intersecting slidable members. Examples of slidable members are bearings, rings, wheels, and pipes. Examples of vertical longitudinal rails are bars, pipes, angle iron, tube steel, and the like. More elaborate alignment systems, such as rack and pinion systems can be used, but in general are too expensive and not robust enough for the application.

In operation, the moveable false floor starts to move towards the top when the dumpster is tilted greater than about 90 degrees. As a practical matter, the dumpster is normally inverted so quickly, that the moveable false floor moves only a short distance before the dumpster is inverted. Likewise, when the dumpster is tilted upright, the moveable false floor starts to move towards the bottom when the dumpster is tilted to an angle less than about 90 degrees, but as a practical matter the rotation is so quick, that very little movement of the floor occurs before the dumpster is upright, so alignment is less of an issue than one might speculate. If the trash collection truck has very slow operating hydraulic lift-tilt system, the guiding means operation will delay movement by the false floor until the dumpster is approaching a fully inverted orientation.

The invented apparatus changes the method of collecting trash. In a conventional collection, after tilting the dumpster from an upright orientation towards an inverted orientation, the hydraulic lift-tilt system is used to shake the dumpster, and if the design to the dumpster permits, the dumpster is banged on the collection port of the truck to dislodge the trash. With the invented dumpster the moveable false floor drops a predetermined length from the bottom of the dumpster, wherein said dropping false floor pushes trash out of the dumpster through the top opening, and upon reaching the predetermined length the floor is abruptly stopped causing the dumpster to shake therein dislodging adhered trash. No banging or shaking is performed by the trash collection. When the invented dumpster is returned to the upright position, the moveable false floor moves back to the bottom. The method reduces the time required for emptying the dumpster, as there is no shaking or banging step.

A conventional dumpster with a fixed bottom wall and a top opening to a dumpster with a moveable false floor can be converted to the invented dumpster. The method comprises the steps of: opening and/or removing a covering lid if the dumpster is equipped with one; removing all or selected portions of the fixed bottom wall of the dumpster to create access from the bottom of the dumpster; fixedly attaching a plurality of stops and a plurality of lower coupling elements to the dumpster at a point proximate to the bottom wall, where the stops are positioned to prevent the moveable false floor from hitting the lower coupling elements; fitting the moveable false floor comprised of a planar member with a plurality of upper coupling elements on a lower side of the plate; lowering the moveable false floor into the dumpster such that said moveable false floor rests on the stops; repositioning the covering lid if the dumpster is equipped with one; and attaching a restraining means, wherein said restraining means comprises a plurality of connecting elements, where a connecting element is attached to an upper coupling element and a lower coupling element, where said restraining means provides the moveable false floor freedom to move a predetermined length toward the top opening, where upon reaching the predetermined length the restraining means abruptly stops the floor causing the dumpster to shake dislodging adhered trash, and then when the dumpster is returned to an upright orientation, the floor returns to the bottom of the dumpster.

From the foregoing, it is readily apparent that I have invented an improved dumpster, wherein the dumpster can be emptied without shaking or banging to dislodge trash adhered to the walls and rim of the dumpster, thereby reducing the maintenance on the trash collection trucks. Furthermore, I have invented a dumpster that can be emptied faster than a conventional dumpster.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A dumpster, said dumpster comprising:

a walled container;

a moveable false floor that moves unaided in the walled container depending on an orientation of the dumpster, said moveable false floor comprised of a planar member having a plurality of upper coupling elements on a lower side of the moveable false floor, where said moveable false floor falls from a resting position proximal to a bottom of the dumpster towards a top opening of the dumpster to a predetermined position when the dumpster is tilted from an upright orientation towards an inverted orientation, and the moveable false floor falls back to the resting position when the dumpster is returned to the upright orientation;

a plurality of lower coupling elements fixedly attached to the dumpster proximate to the bottom; and a restraining means on an underside of the moveable false floor, wherein said restraining means comprises a plurality of chains having a predetermined length, where each chain is attached to an upper coupling element and a lower coupling element, where said restraining means provides the moveable false floor freedom to fall a predetermined distance toward the top opening to the predetermined position, pushing out trash when the dumpster is tilted toward the inverted orientation, where upon reaching the predetermined position the restraining means abruptly stops the floor causing the dumpster to shake dislodging adhered trash, and then when the dumpster is returned to the upright orientation, the floor returns to the bottom of the dumpster;

where the predetermined length of chain is selected such that the distance the floor can fall before being stopped is sufficient to cause the dumpster to shake hard enough to dislodge adhered trash on stopping.

2. The dumpster, as claimed in claim 1, wherein said upper coupling element is a bracket with an eyelet.

3. The dumpster, as claimed in claim 1, wherein said lower coupling element is a bracket with an eyelet.

4. The dumpster according to claim 1, where the dumpster further comprises a plurality of stops that prevent the moveable false floor from hitting the plurality of lower coupling elements.

5. The dumpster, as claimed in claim 1, wherein said planar member is structurally reinforced with beams spanning the planar member.

6. The dumpster according to claim 1, wherein said dumpster further comprises a covering lid that closes over the top opening.

7. The dumpster according to claim 1, wherein said dumpster further comprises a guiding means in corners of the walled container formed by the intersection of a side-wall and an end-wall, wherein said guiding means helps maintain the moveable false floor aligned substantially perpendicular to a sidewall of the dumpster, and delays movement by the false floor until the dumpster is approaching a fully inverted orientation.

8. The dumpster according to claim 4, wherein said stops further comprise a dampening means that slowly stops the movement of the false floor when it returns to the bottom of the dumpster.

9. The dumpster according to claim 7, wherein said guiding means comprises a plurality of vertical longitudinal rails and intersecting slidable members.

* * * * *